US012576636B2

(12) United States Patent
Hamada et al.

(10) Patent No.: US 12,576,636 B2
(45) Date of Patent: Mar. 17, 2026

(54) LIQUID DISCHARGE HEAD

(71) Applicant: CANON KABUSHIKI KAISHA, Tokyo (JP)

(72) Inventors: Yoshihiro Hamada, Kanagawa (JP); Takatsugu Moriya, Tokyo (JP); Shin Ishimatsu, Kanagawa (JP); Keiji Tomizawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 143 days.

(21) Appl. No.: 18/394,871

(22) Filed: Dec. 22, 2023

(65) Prior Publication Data

US 2024/0208215 A1 Jun. 27, 2024

(30) Foreign Application Priority Data

Dec. 27, 2022 (JP) ................................ 2022-210351

(51) Int. Cl.

| | |
|---|---|
| ***B41J 2/14*** | (2006.01) |
| ***B41J 2/15*** | (2006.01) |
| ***B41J 2/165*** | (2006.01) |
| ***B41J 2/17*** | (2006.01) |

(52) U.S. Cl.

CPC ............ *B41J 2/14016* (2013.01); *B41J 2/15* (2013.01); *B41J 2/1721* (2013.01); *B41J 2002/14459* (2013.01); *B41J 2/16502* (2024.05)

(58) Field of Classification Search

CPC . B41J 2/175; B41J 2/18; B41J 2/17513; B41J 2/17553; B41J 2/14016; B41J 2/15; B41J 2/1721; B41J 2/16502; B41J 2002/14459

See application file for complete search history.

(56) References Cited

U.S. PATENT DOCUMENTS

| | | | | |
|---|---|---|---|---|
| 2013/0083136 A1* | 4/2013 | Govyadinov | ........ | B41J 2/14145 347/85 |
| 2017/0334210 A1* | 11/2017 | Saito | .................... | B41J 2/17523 |

FOREIGN PATENT DOCUMENTS

| | | |
|---|---|---|
| JP | 2017-159614 A | 9/2017 |

* cited by examiner

*Primary Examiner* — Thinh H Nguyen

(74) *Attorney, Agent, or Firm* — Venable LLP

(57) ABSTRACT

In a liquid discharge head including a discharge-port forming member having a discharge-port row in which a plurality of discharge ports for discharging a liquid which is aligned in a predetermined aligning direction, a plurality of individual liquid chambers which cause each of the plurality of discharge ports to communicate with a common liquid chamber, and an element board having a plurality of elements which generates energy for discharging the liquid and disposed in the individual liquid chamber, a first supply port connecting to the common liquid chamber and a first collecting port connecting to the common liquid chamber, a second supply port disposed further an outer side than an end portion of the discharge-port row in the aligning direction and a second collecting port disposed closer to the outer side than the end portion of the discharge-port row in the aligning direction are provided.

20 Claims, 10 Drawing Sheets

LIQUID DISCHARGE HEAD

BACKGROUND OF THE INVENTION

Field of the Invention

This disclosure relates to a liquid discharge head.

Description of the Related Art

Conventionally, as a liquid discharge head used in a liquid discharge apparatus such as an inkjet printer, a liquid discharge head which drives a drive element (energy generating element) such as a piezoelectric element and an electrothermal conversion element and ejects a liquid on the basis of generation of a pressure or air bubbles is known. In such a liquid discharge head, in the Japanese Patent Application Publication No. 2017-159614, strength reinforcement and density of a nozzle are enhanced using a configuration including a dummy element.

SUMMARY OF THE INVENTION

The liquid discharge head is configured such that each of a plurality of discharge ports is individually connected to a common liquid chamber via a pressure chamber in which an energy generating element is disposed. In the configuration as above, in discharge-port rows aligned and disposed in a predetermined aligning direction, a difference or variation in a recoverability or easiness of occurrence of nozzle clogging may occur during sucking recovery by using a cap during maintenance, preliminary discharge by driving the energy generating element, or the like.

This disclosure has an object to provide an art with which uniformization in behaviors among the discharge ports aligned in plural in a liquid discharge head is enhanced.

In order to achieve the aforementioned object, the liquid discharge head according to one aspect of this disclosure includes the following:

a discharge-port forming member having a discharge-port row in which a plurality of discharge ports, which discharge a liquid, is aligned in a predetermined aligning direction, a plurality of individual liquid chambers which communicates with each of the plurality of discharge ports, respectively, and a common liquid chamber which communicates with the plurality of individual liquid chambers; and an element board having a plurality of elements which generates energy for discharging the liquid and disposed in the individual liquid chamber, a first supply port connecting to the common liquid chamber and a first collecting port connecting to the common liquid chamber, wherein the element board further includes:

a second supply port disposed further toward an outer side than an end portion of the discharge-port row in the aligning direction, and a second collecting port disposed further toward the outer side than the end portion of the discharge-port row in the aligning direction.

According to this disclosure, the behaviors among the discharge ports aligned in plural in the liquid discharge head can be uniformized.

Further features of this disclosure will become apparent from the following description of exemplary embodiments with reference to the attached drawings.

DESCRIPTION OF THE EMBODIMENTS

Hereinafter, with reference to the drawings, forms for working this invention will be explained in detailed exemplifiable manner on the basis of embodiments. It is to be noted that dimensions, materials, shapes, and relative dispositions of components described in the embodiments should be changed as appropriate depending on configurations and various conditions of apparatuses to which the invention is applied. Moreover, it does not necessarily require all the combinations of features explained in the embodiments for solutions of this disclosure. Constituent elements described in the embodiments are only exemplification and are not intended to limit a scope of this invention only to them.

Figure 1:
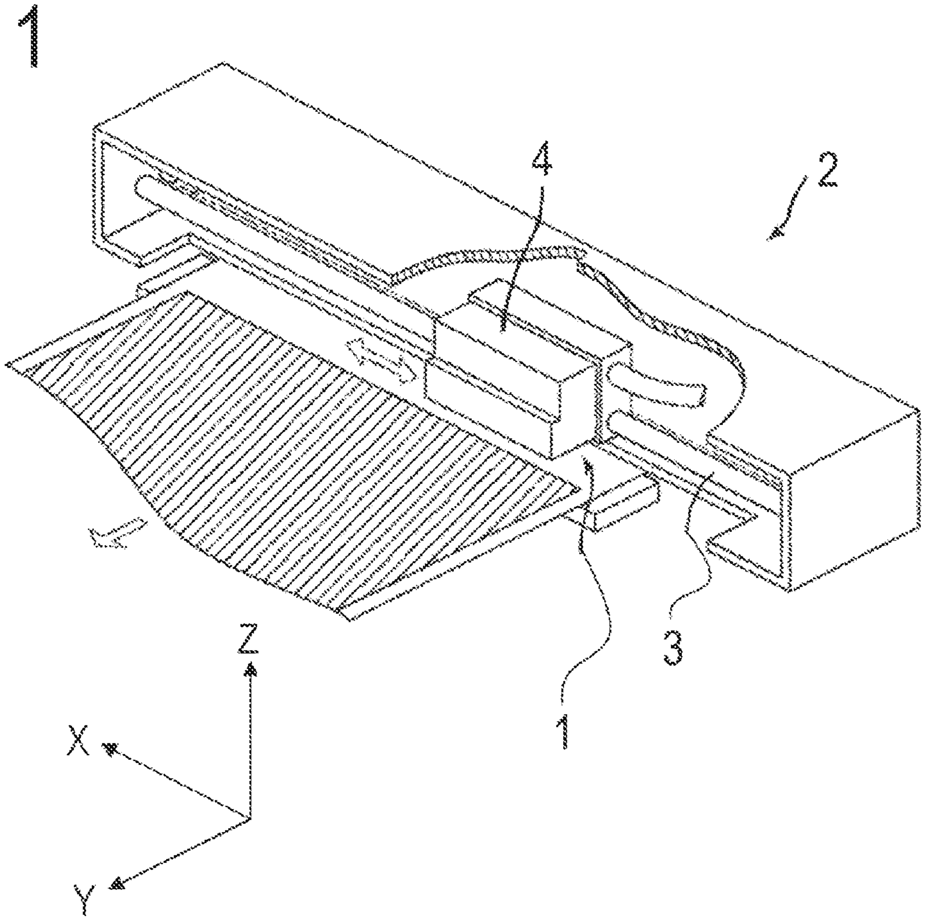
FIG. 1 is a diagram illustrating a schematic configuration of a liquid discharge apparatus.

FIG. 1 illustrates a liquid discharge apparatus 2 on which a liquid discharge head 1 according to an embodiment of this disclosure is mounted. The liquid discharge head 1 which will be explained below is configured as an inkjet recording head used for recording a desired image on a medium by discharging an ink as a liquid to the medium in an inkjet printer or the like as a recording apparatus. However, this disclosure can be preferably applied to applications other than the inkjet recording head.

As the liquid discharge method of the liquid discharge apparatus according to this Embodiment, a piezo method or a thermal method is preferably employed. The piezo method is such a method that a voltage is applied to a piezoelectric element (piezo element) as an element which generates energy for discharging a liquid so as to change a volume, and the ink is discharged by using the energy generated at that time. The thermal method is such a method that the ink is heated by a heater as an element so as to generate air bubbles, and the energy generated at that time is used so as to discharge the ink. It is to be noted that methods other than them may be used.

The liquid discharge apparatus 2 of this Embodiment is a serial-scanning type recording apparatus, and a carriage 4 is guided by a guide shaft 3 movably in a main scanning direction (X-direction). The liquid discharge head 1 is mounted on the carriage 4 and is mounted in the liquid discharge apparatus 2 capable of relative movement with respect to a medium. The carriage 4 is reciprocated in the main scanning direction by a carriage motor, not shown, and a drive-force transmission mechanism, not shown, such as a belt transmitting the drive force. The liquid discharge apparatus 2 repeats a discharge operation which causes a liquid such as ink to be discharged toward the medium and a conveying operation which conveys the medium in a sub scanning direction (Y-direction) only by a distance corresponding to a recording width thereof while moving the liquid discharge head 1 in the main scanning direction. As a result, the desired image or the like is recorded on the medium. At this time, the liquid discharge apparatus 2 conveys the medium in a conveying direction (Y-direction) crossing the main scanning direction of the liquid discharge head 1 by a conveyance mechanism such as a feed roller, not shown.

Figure 2:
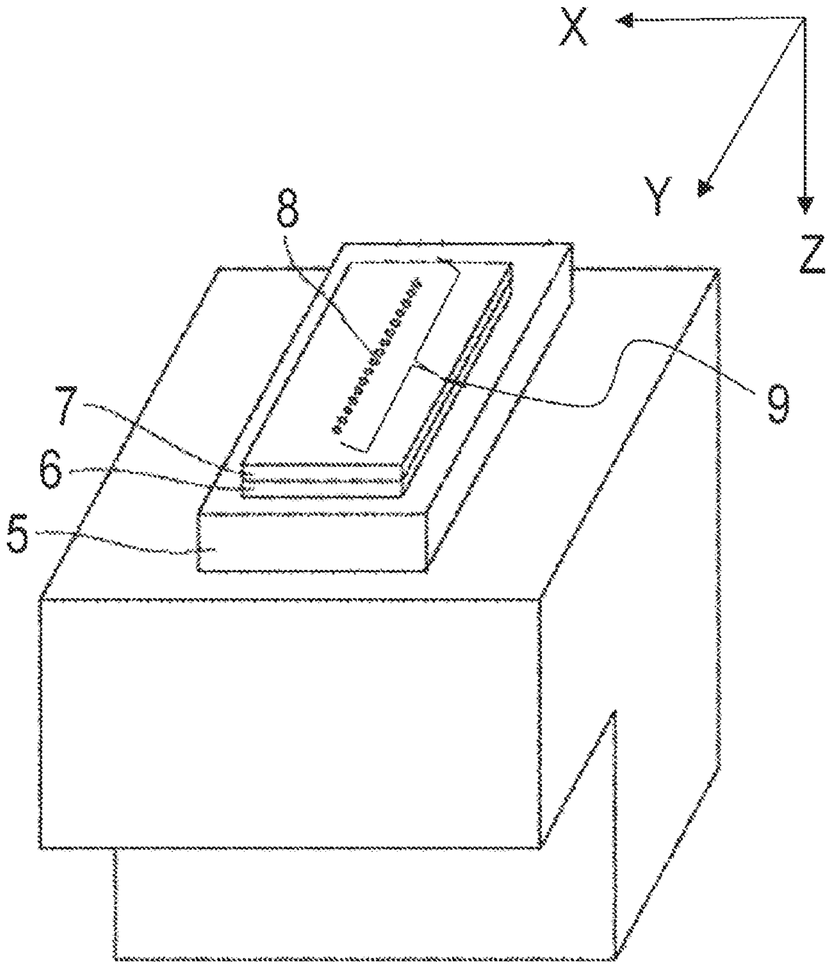
FIG. 2 is a diagram illustrating a schematic configuration of a liquid discharge head.

FIG. 2 is a perspective view of the liquid discharge head 1 shown in FIG. 1. The liquid discharge head 1 has a support member 5, an element board 6, and a discharge-port forming member 7. The discharge-port forming member 7 includes a plurality of discharge-port rows 9 in which a plurality of the discharge ports 8 discharging a liquid is aligned substantially at equal intervals. The liquid stored in a tank (not shown) is supplied to the liquid discharge head 1 and is supplied to the discharge port 8 via a channel provided in the support member 5.

This Embodiment relates to an inkjet recording apparatus in a form of circulating a liquid such as ink between a tank and a liquid discharge head, but the form may be other than that. For example, it may be such a form that two tanks are provided on an upstream side and a downstream side of the liquid discharge head without circulating the ink, and the ink in the pressure chamber is made to flow by causing the ink to flow from one of the tanks to the other tank.

Moreover, the liquid discharge head according to this Embodiment is a liquid discharge head of a so-called serial type in which the recording is performed while a medium to be recorded is being scanned, but this Embodiment can be applied also to a so-called line-type head having a length corresponding to a width of the medium to be recorded. As the serial-type liquid discharge head, such a configuration that an element board for black ink and an element board for color ink are mounted one each can be cited, for example, but this is not limiting. Specifically, it may be in a such a form that a short line head in which several element boards are disposed so that discharge-port nozzle rows are overlapped in a discharge-port nozzle-row direction and which is shorter than a width of a medium to be recorded is created and is caused to scan the medium to be recorded.

First Embodiment

Figure 3:
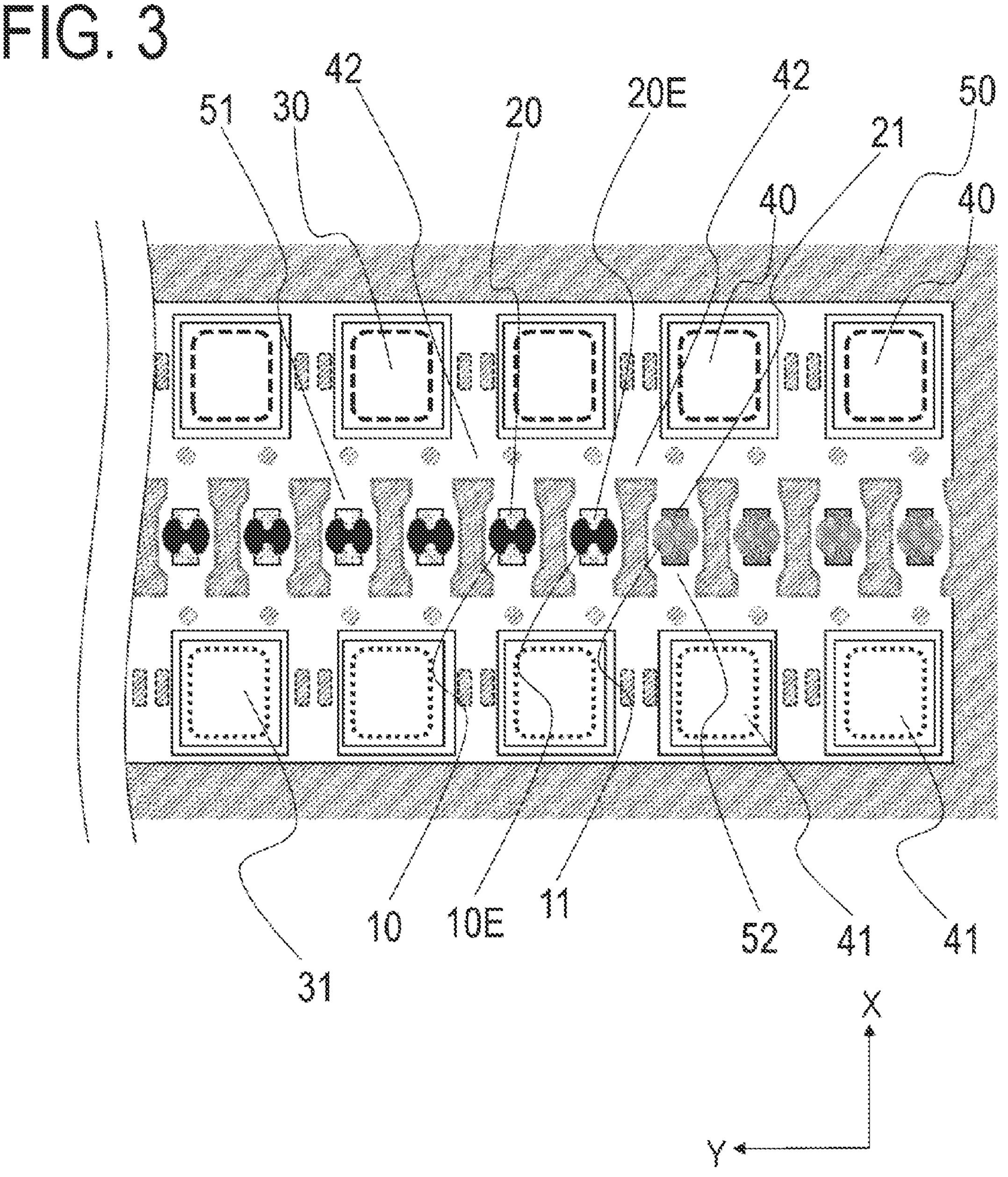
FIG. 3 is a diagram illustrating an outline of a First Embodiment.

FIG. 3 illustrates an outline of a First Embodiment. FIG. 3 is a section (section viewed in the Z-direction) in parallel with each of the main scanning direction (X-direction) and a sub scanning direction (Y-direction) in the liquid discharge head 1 according to this Embodiment and is an enlarged sectional diagram in the vicinity of an end portion of a discharge-port row 9. In the liquid discharge head 1, a main discharge element 20 related to recording, a main discharge port 10 corresponding to the main discharge element 20, and a pressure chamber 51 as an individual liquid chamber corresponding to the main discharge element 20 and the main discharge port 10 are aligned in plural along a predetermined aligning direction at equal intervals. The predetermined aligning direction is a longitudinal direction of the element board 6, for example, and a direction (direction along the main scanning direction) in parallel with a conveying direction of the medium. Along those aligning directions, on both sides of the main discharge element 20 and the main discharge port 10 in a direction (width direction of the medium, sub scanning direction) orthogonal to the aligning direction, a plurality of supply ports (first supply ports) 30 and a plurality of collecting ports (first collecting ports) 31 are aligned. With respect to the rows of the main discharge elements 20 and the main discharge ports 10, the plurality of supply ports (first supply ports) 30 is disposed on one side in a direction orthogonal to the aligning direction, and the plurality of collecting ports (first collecting ports) 31 is disposed on the other side in the direction orthogonal to the aligning direction, respectively.

The plurality of pressure chambers 51 and the plurality of supply ports 30 as well as the plurality of collecting ports 31 communicate with one another via a common liquid chamber 42 extending in the longitudinal direction of the element board 6. The plurality of pressure chambers 51 has the common liquid chambers communicating with each of the plurality of main discharge ports 10, respectively. These main discharge ports 10, supply ports 30, collecting ports 31, pressure chambers 51, the common liquid chambers 42 and the like are formed on a frame body 50 constituted by joining the element board 6 and the discharge-port forming member 7. A liquid such as ink is supplied from the supply port 30 into the frame body 50, that is, to the common liquid chamber 42, flows into each of the pressure chambers 51 and is ejected/collected from the collecting ports 31.

Here, in the liquid discharge head 1 of this Embodiment, a sub discharge element 21 and a sub discharge port 11 not related to the recording are provided further toward an end portion side in the longitudinal direction of the element board 6 than the main discharge element 20 and the main discharge port 10 are. Moreover, a sub supply port 40 and a sub collecting port 41 are provided further toward the end portion side in the longitudinal direction of the element board 6 than the main discharge port 10 and the main discharge element 20 are.

Figure 4A:
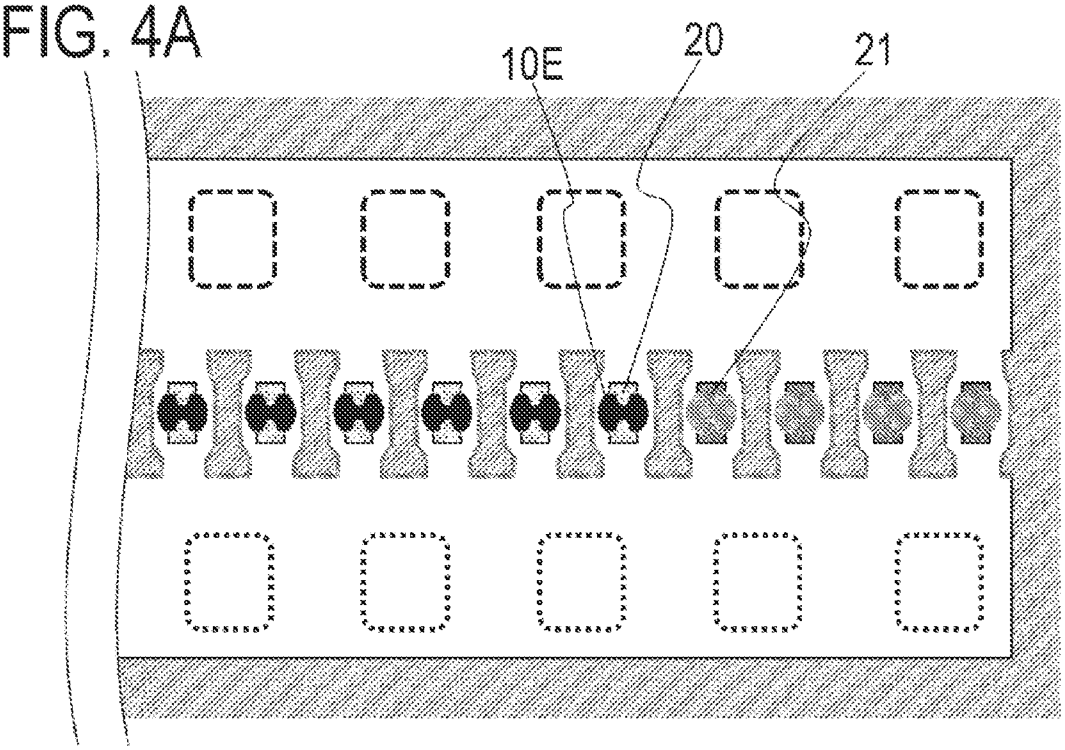
FIGS. 4A and 4B are schematic diagrams illustrating a recording outline.
Figure 4B:
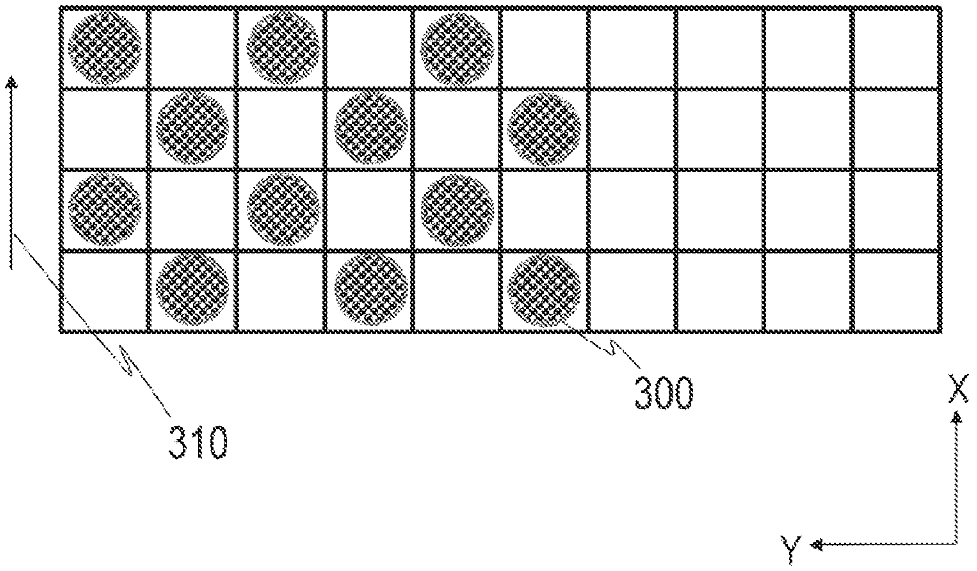

By using FIGS. 4A and 4B, differences between the main discharge port 10 and the main discharge element 20 related to the recording and the sub discharge element 21 and the sub discharge port 11 not related to the recording will be explained. FIG. 4A is a schematic sectional diagram of the liquid discharge head 1 according to this Embodiment similar to FIG. 3, and FIG. 4B is a schematic diagram illustrating a state of an ink droplet dropped onto the medium correspondingly to the alignment of the main discharge port 10 in FIGS. 4A and 4B. An arrow in FIG. 4B indicates a printing direction 310 (conveying direction of the medium). In FIG. 4B, records (printing dots) 300, which are print droplets impacted on a printing target after the printing, are illustrated. The main discharge port 10 and the main discharge element 20 related to the recording are a discharge port and a discharge element provided for the records (printing dots) 300, while the sub discharge element 21 and the sub discharge port 11 not related to the recording do not form the records 300.

Figure 5:
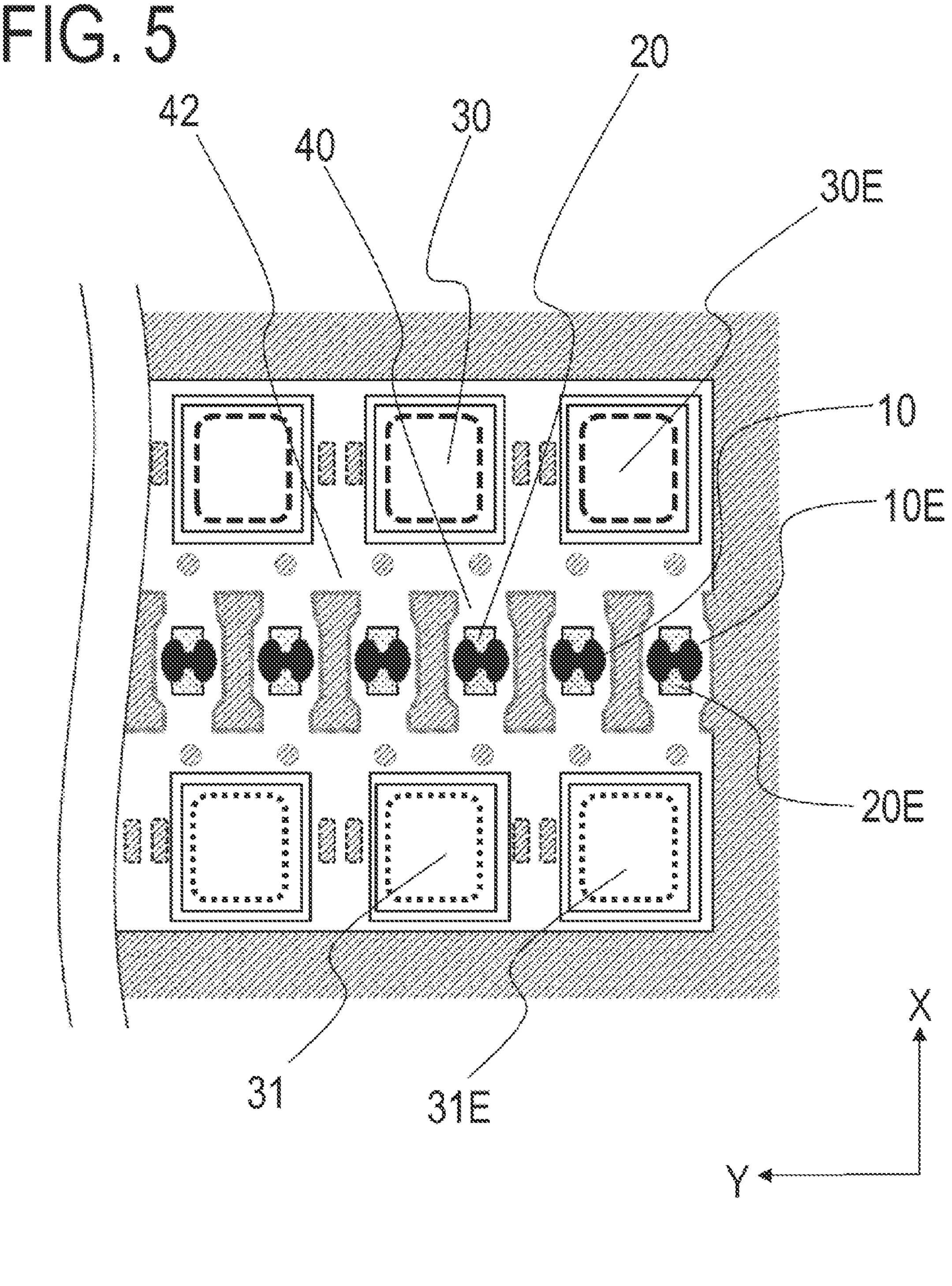
FIG. 5 is a schematic diagram illustrating an outline of a comparative example.

FIG. 5 is a sectional diagram similar to FIG. 3 and is a sectional diagram in a liquid discharge head according to a comparative example. In the liquid discharge head according to the comparative example, it is configured such that the sub discharge element 21, the sub discharge port 11, the sub supply port 40, and the sub collecting port 41 are not provided further toward the end portion side than the main discharge port 10 and the main discharge element 20 are.

Figure 6A:
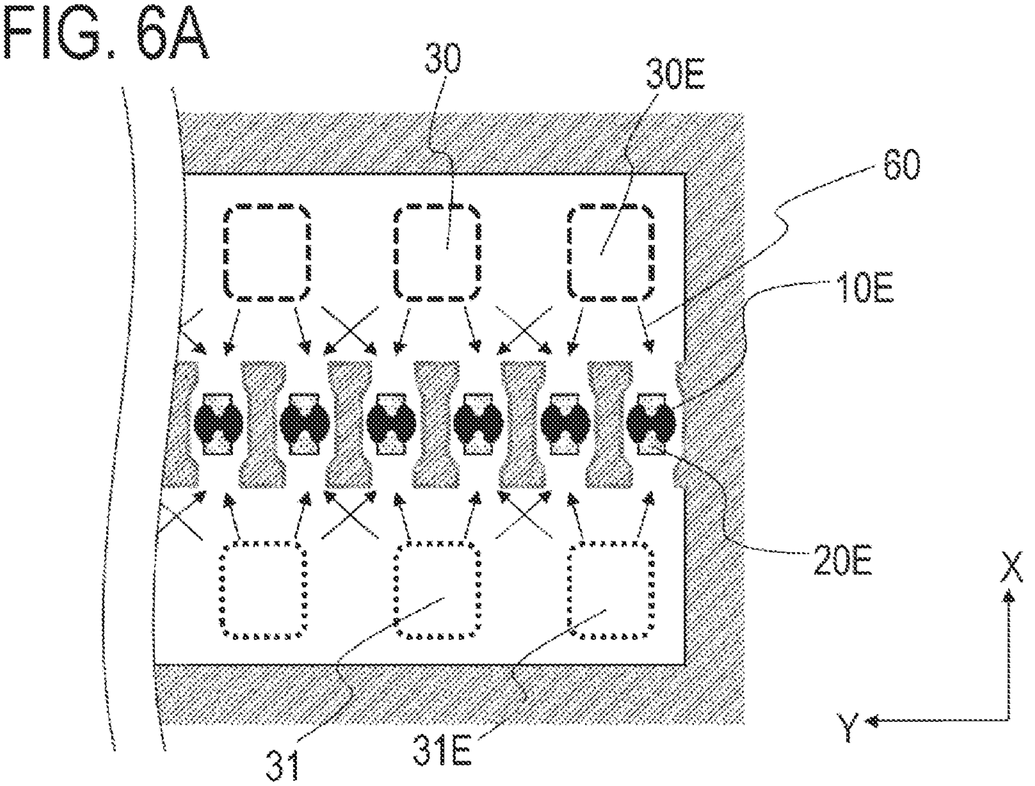
FIGS. 6A and 6B are schematic diagrams illustrating an effect outline of the First Embodiment.
Figure 6B:
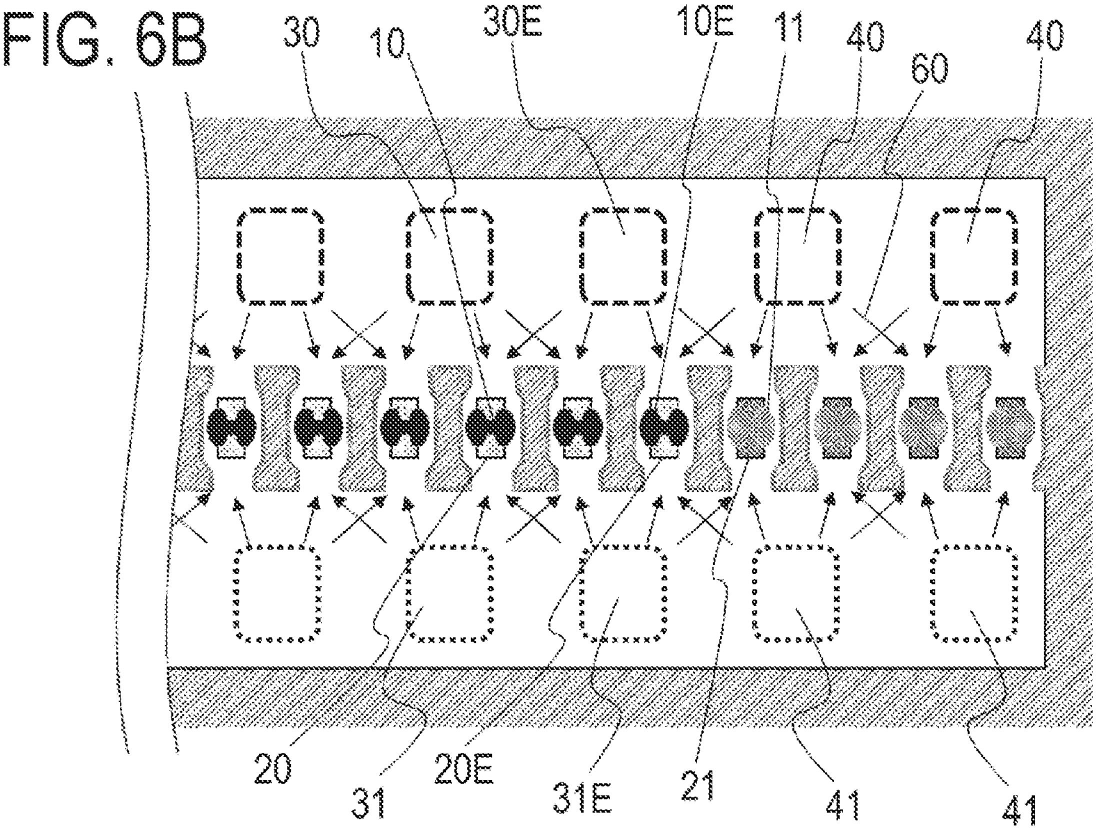

FIGS. 6A and 6B illustrate images of a flow 60 of a liquid during a recovery operation. FIG. 6A is a schematic diagram illustrating the image of the flow 60 of the liquid in the comparative example shown in FIG. 5 and is a sectional diagram corresponding to FIG. 5. FIG. 6B is a schematic diagram illustrating the image of the flow 60 of the liquid in this Embodiment shown in FIG. 3 and a sectional diagram corresponding to FIG. 3.

In order to eject ink in the liquid discharge head to outside the liquid discharge head against thickening of the ink or to eject air bubbles generated in the ink, the sucking recovery using a cap or recovery by the preliminary discharge by driving the drive element is performed. These maintenance operations are performed between the printing operations (discharge operations) or the like as appropriate. Particularly, the preliminary discharge also called idle discharge is a discharge operation of the ink that does not perform recording onto the medium and is performed regardless of a print signal.

When these operations are to be performed, the liquid is supplied to the main discharge port 10, which is not on the end portion in the alignment, from both sides in the discharge-port aligning direction of a discharge-port row end-portion and a discharge-port row center-side. On the other hand, the end-portion main discharge port 10E disposed on the end portion in the aligning direction among the main discharge ports 10 is disposed such that the supply port 30 (end-portion supply port 30E) is provided only on one side on the center side in the discharge-port aligning direction and thus, with the configuration in the comparative example in FIG. 6A, a liquid supply amount is smaller, and recoverability is lowered. Moreover, the thickened ink or bubbles are easily generated on the end portion of the discharge-port row, but since ejection is made from the end-portion main discharge port 10E, with the configuration of the comparative example in FIG. 6A, clogging of the discharge port easily occurs in the end-portion main discharge port 10E, and makes a major factor of frequent printing failure of the end-portion main discharge port 10E.

On the other hand, as shown in FIG. 6B, in this Embodiment, the sub supply port 40 and the sub collecting port 41 are provided further toward the end portion side than the end-portion main discharge port 10E are. That is, in the aligning direction of the discharge-port row in which nozzle sets of the main discharge element 20, the main discharge port 10, and the pressure chamber 51 are aligned in plural, the sub supply port 40 as a second supply port and the sub collecting port 41 as a second collecting port are disposed further toward the outer side than the end portion of the discharge-port row. The sub supply port 40 and the sub collecting port 41 are, as shown in FIGS. 4A and 4B, disposed at positions deviated from a recording area (dischargeable area) of the liquid discharge head 1. Moreover, the sub supply port 40 and the sub collecting port 41 are disposed at positions aligned with the sub discharge element 21 and the sub discharge port 11 in the aligning direction of the discharge-port row, respectively, and are disposed closer to the sub discharge element 21 and the sub discharge port 11 than the main supply port 30 and the main collecting port 31. Moreover, the sub supply ports 40 are provided in plural and disposed so as to form one row with respect to the alignment of the plurality of main supply ports 30. Similarly, the sub collecting ports 41 are provided in plural and are disposed so as to form one row with respect to the alignment of the plurality of main collecting ports 31. Furthermore, the sub supply port 40 and the sub collecting port 41 are configured having the same shapes as those of the main supply port 30 and the main collecting port 31, that is, their opening areas are substantially the same, respectively.

By means of these sub supply ports 40 and sub collecting ports 41, a liquid supply amount to the end-portion main discharge port 10E is increased more than the comparative example and thus, recoverability is improved. Moreover, since the thickened ink and the bubbles generated on the end portion in the discharge-port row are ejected from the sub discharge port 11, the clogging of the main discharge port 10 is suppressed, and printing failure is suppressed. Moreover, the sub discharge port 11 is a combination with the sub discharge element 21 not related to the recording but is also capable of discharge at the preliminary discharge operation so as to promote ejection of the thickened ink. As a result, a printing quality can be improved.

Here, the main discharge element 20 and the sub discharge element 21 are configured capable of individual operation control independently from each other, and at the discharge operation, by means of a tension of a film of the ink, the ink does not leak out of the sub discharge port 11 unless the sub discharge element 21 is operated. The main discharge element 20 as the first energy generating element is used not only in the discharge operation but also in various operations at the maintenance, but the sub discharge element 21 as the second energy generating element is used only at the maintenance.

Figure 7A:
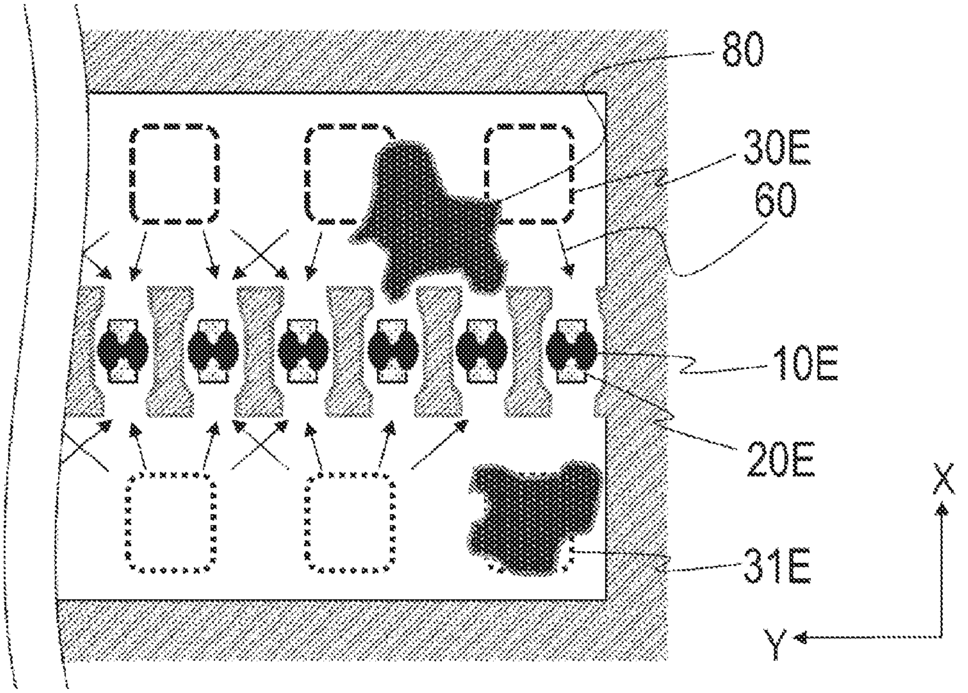
FIGS. 7A and 7B are schematic diagrams illustrating an effect outline of the First Embodiment.
Figure 7B:
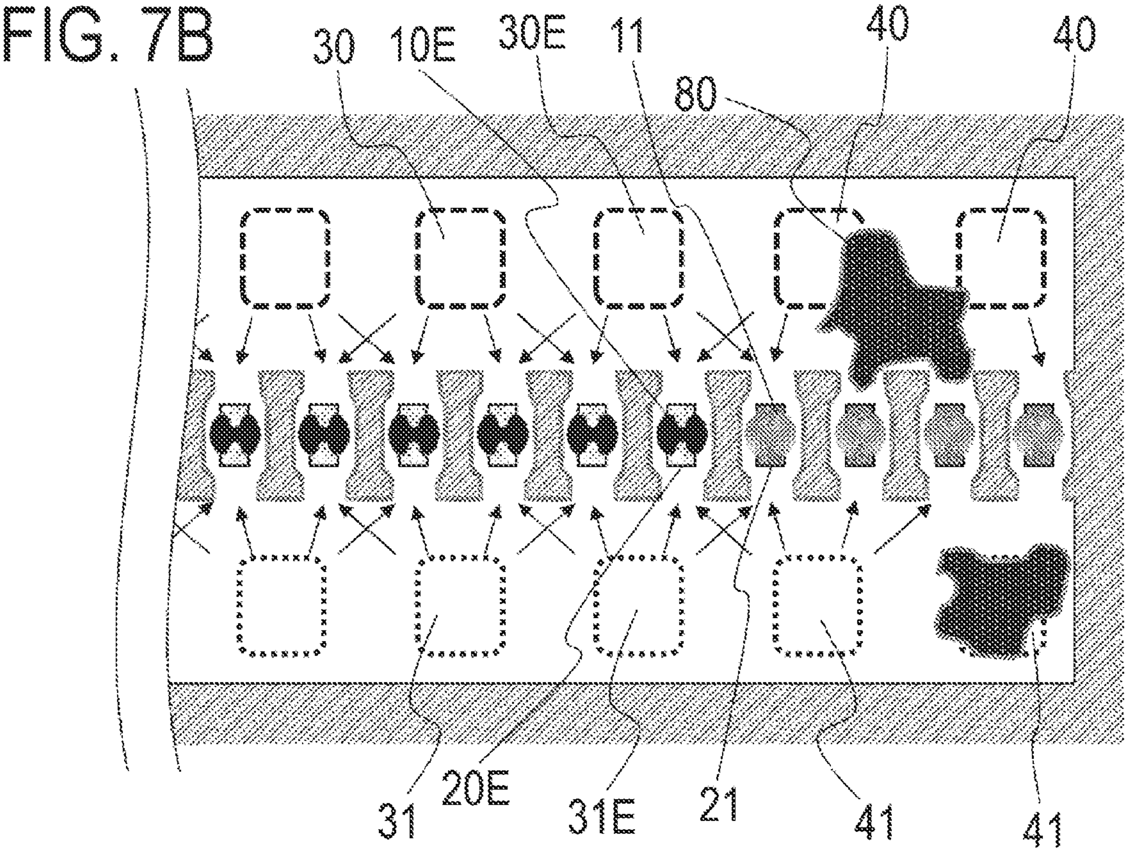

FIGS. 7A and 7B illustrate images of a flow of the liquid at the recovery operation when debris 80 is present in the vicinity of the end-portion supply port 30E and the end-portion collecting port 31E. FIG. 7A is an image in the comparative example, and since the liquid supply amount decreases in the end-portion main discharge port 10E, the recoverability becomes lower than the case where the debris 80 is not present. On the other hand, in this Embodiment shown in FIG. 7B, since the decrease in the liquid supply amount to the end-portion main discharge port 10E is small, lowering of the recoverability is suppressed.

Figure 8A:
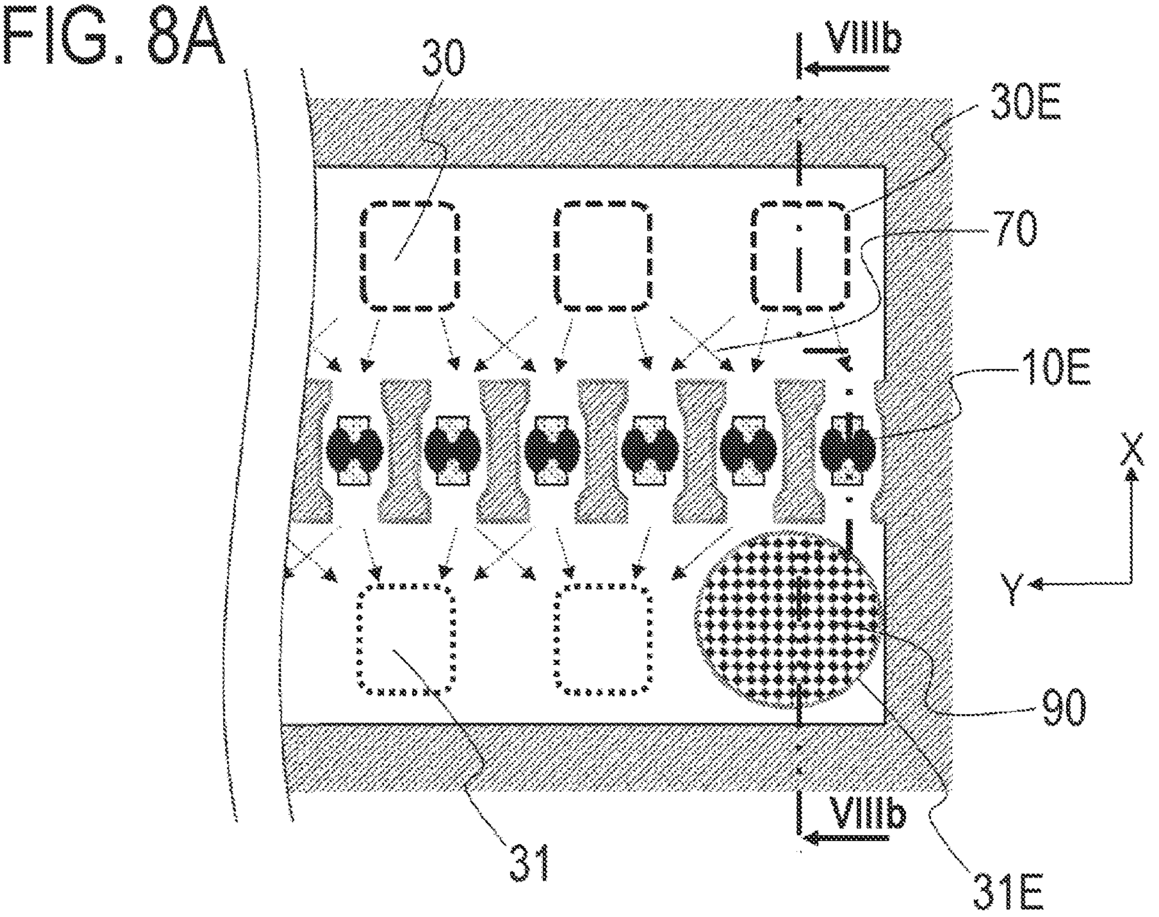
FIGS. 8A and 8B are schematic diagrams illustrating an effect outline of the First Embodiment.
Figure 8B:
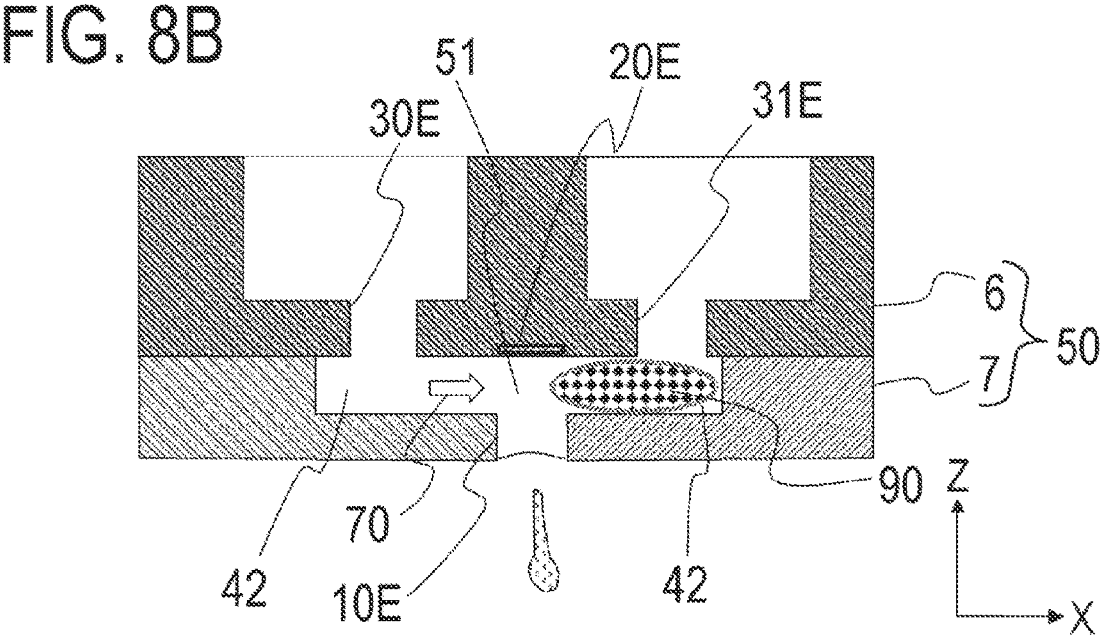
Figure 9A:
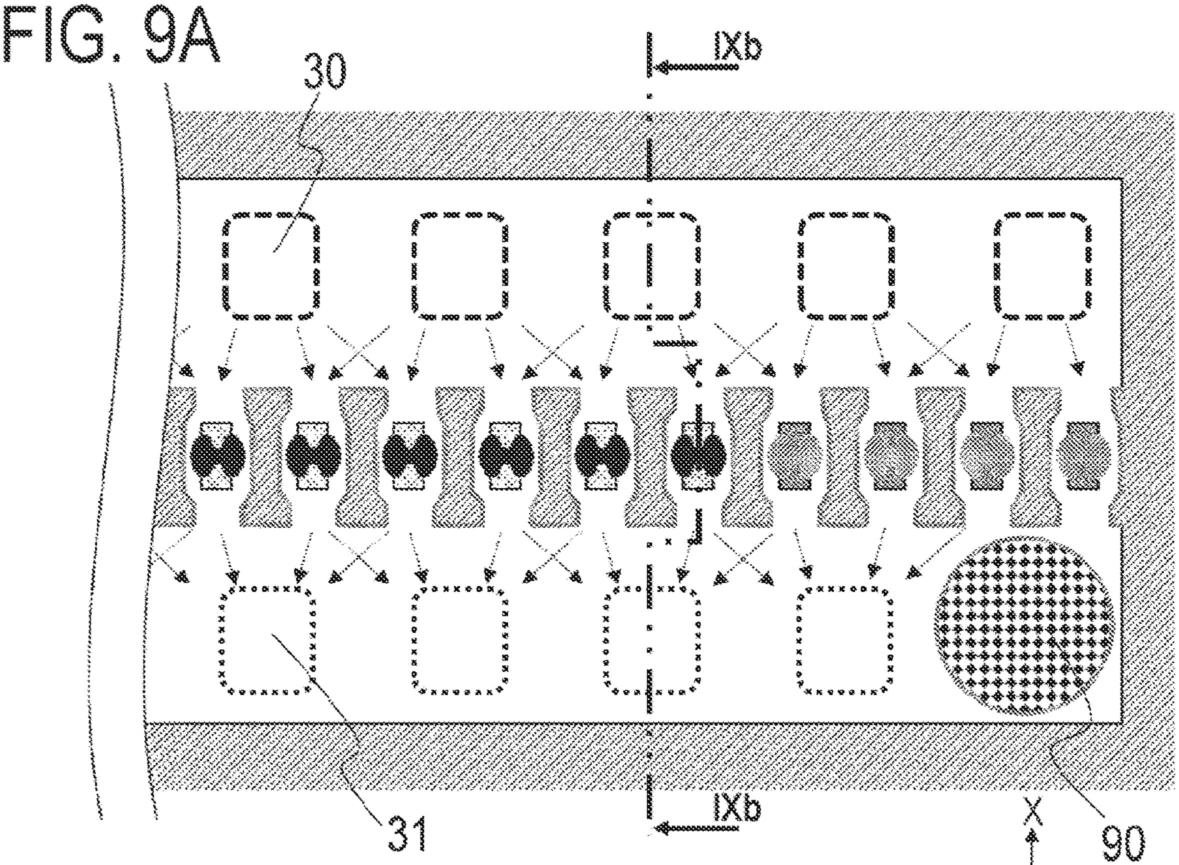
FIGS. 9A and 9B are schematic diagrams illustrating an effect outline of the First Embodiment.
Figure 9B:
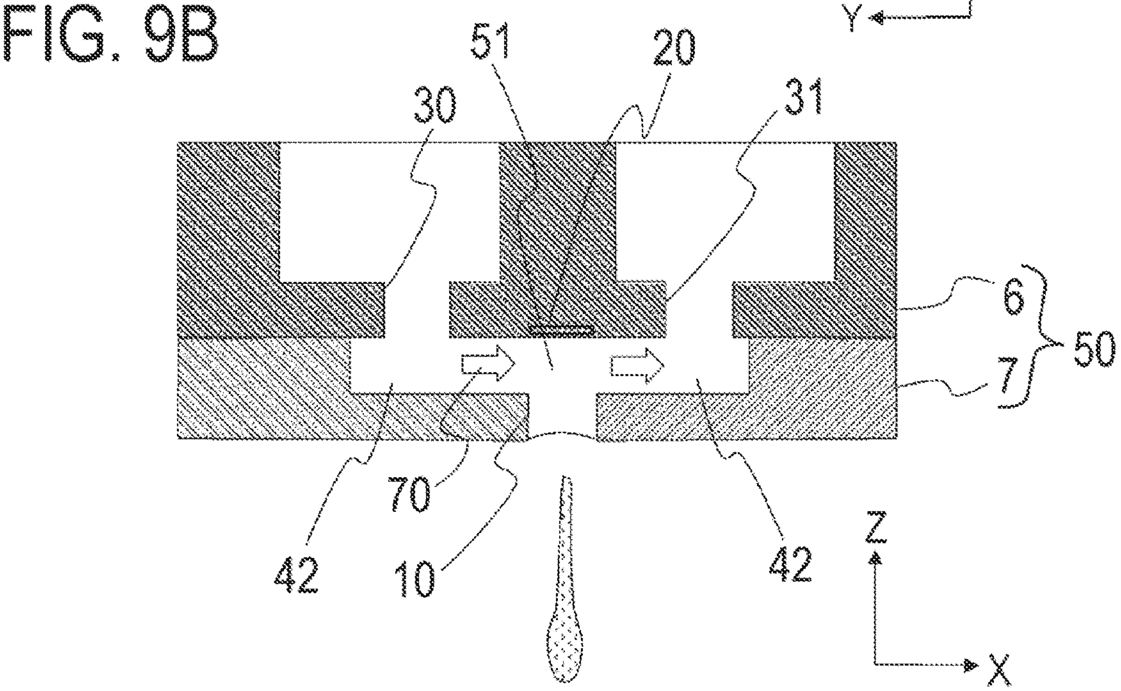

FIGS. 8A to 9B illustrate images of a flow 70 of ink circulation at printing when there are bubbles 90 in the vicinity of the end-portion collecting port 31E. FIGS. 8A and 8B are images of the comparative examples. FIG. 8A is a sectional diagram similar to FIG. 3, and FIG. 8B is a sectional diagram at VIIIb-VIIIb in FIG. 8A. When there are the bubbles 90 in the vicinity of the end-portion collecting port 31E, the ink circulation is inhibited, and there is a possibility that normal discharge cannot be performed from the main discharge element 20 and the main discharge port 10 related to the recording as shown in FIG. 8B. FIGS. 9A and 9B are images of this embodiment. FIG. 9A is a sectional diagram similar to FIG. 3, and FIG. 9B is a sectional diagram at IXb-IXb in FIG. 9A. On the other hand, in this Embodiment, even if there are the bubbles at the end-portion collecting port 31E as shown in FIG. 9A, normal discharge from the main discharge element 20 and the main discharge port 10 related to the recording is possible as shown in FIG. 9B.

It is to be noted that, if the discharge element and the discharge port are manufactured by being shifted to one side by one element due to variation in the manufacture or the like, for example, the sub discharge element and the sub discharge port can be utilized as the main discharge element and the main discharge port. In that case, the sub discharge element and the sub discharge port adjacent to the main discharge element and the main discharge port on the other end portion are utilized as the main discharge element and the main discharge port, and a set of the end-portion main discharge element and the end-portion main discharge port on the one end portion are utilized as the sub discharge element and the sub discharge port. As a result, a printing area in one session of printing is not changed, but a printing position shift due to the manufacture variation can be corrected.

Moreover, it may be so configured that, by designing such that the nozzle sets of the main discharge element 20, the main discharge port 10, the pressure chamber 51 have some surpluses with respect to a width of the recording area on purpose, the surplus nozzle sets described above are used as the sub discharge element 21, the sub discharge port 11, the sub pressure chamber 52. By using the surplus nozzle sets, cost merits such as cost reduction on the design, cost reduction on manufacture (improvement of yield) and the like can be expected.

In this Embodiment, the sub discharge port 11 is configured as an opening portion in the same form as that of the main discharge port 10, but it may be an opening portion in a form different from that of the main discharge port 10 or may be a form simply as a ventilation hole. That is, its configuration only needs to provide such an effect that the liquid (ink) can be spread to the entire common liquid chamber 42. In this case, the sub discharge element 21 does not have to be provided.

Second Embodiment

Figure 10:
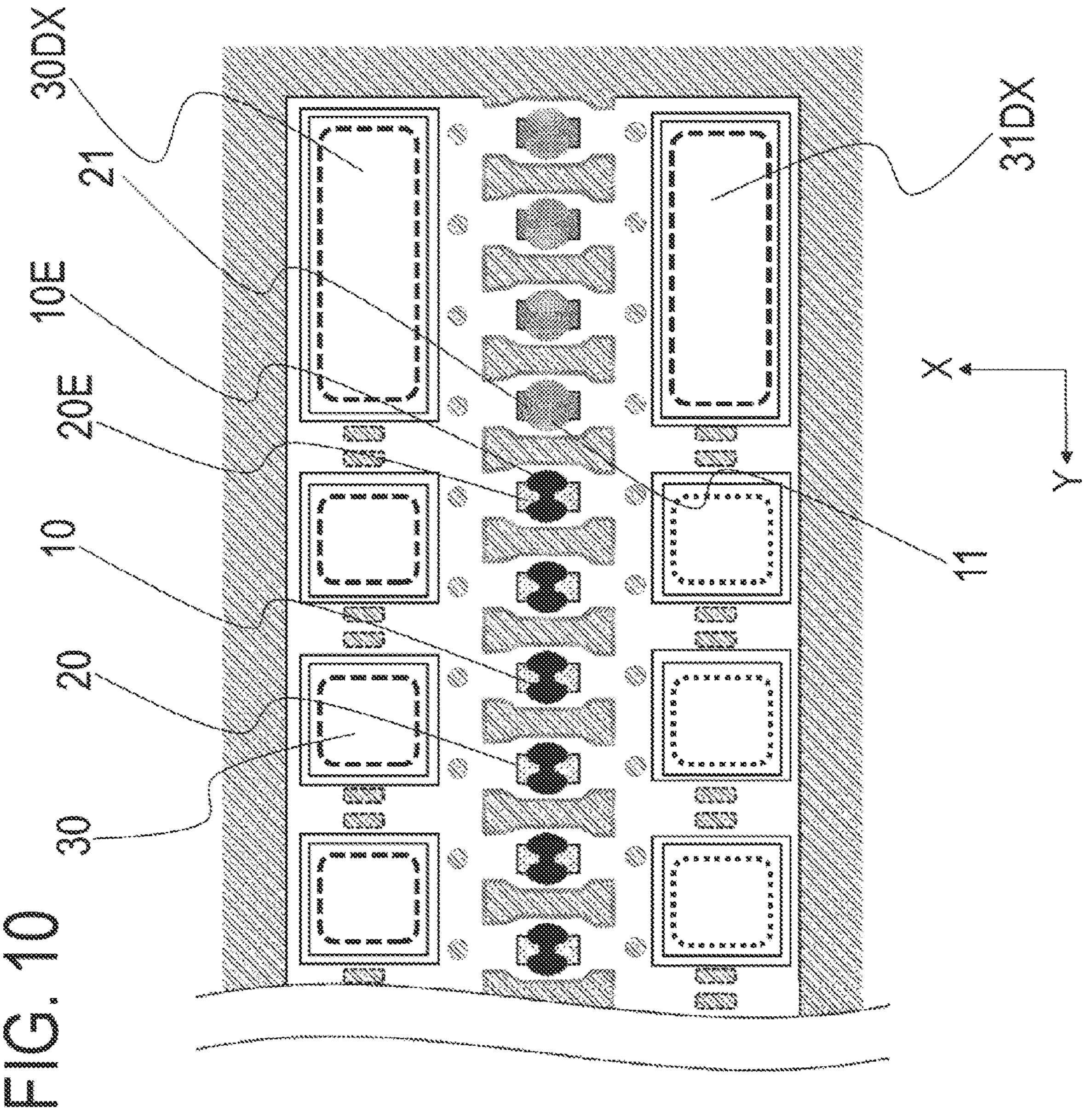
FIG. 10 is a schematic diagram illustrating an outline of a Second Embodiment.

FIG. 10 illustrates an outline of a Second Embodiment of this disclosure. FIG. 10 is a sectional diagram similar to FIG. 3 in the First Embodiment. In the Second Embodiment, the same signs as those of the First Embodiment are given to the similar configuration in the First Embodiment, and detailed explanation will be omitted. Matters not explained in particular here in the Second Embodiment are similar to those of the First Embodiment.

This Embodiment is configured such that opening areas of an enlarged supply port 30DX and an enlarged collecting port 31DX provided on the end portion side of the main discharge element 20 and the main discharge port 10 are larger than the other supply port 30 and the collecting port 31. More specifically, as an example, the enlarged supply port 30DX is formed longer in the aligning direction of the discharge-port row than the main supply port 30. Similarly, the enlarged collecting port 31DX is formed longer in the aligning direction of the discharge-port row than the main collecting port 31. By increasing a flowrate of the end-portion region at the recovery operation, the liquid thickening, the air-bubble staying, and foreign-substance staying in the end-portion region can be suppressed.

Regarding each of the aforementioned Embodiments, configurations thereof can be combined with each other.

While this disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-210351, filed on Dec. 27, 2022, which is hereby incorporated by reference herein in its entirety.

What is claimed is:

1. A liquid discharge head comprising:

a discharge-port forming member having a discharge-port row in which a plurality of discharge ports, which discharge a liquid, is aligned in a predetermined aligning direction, a plurality of individual liquid chambers which communicates with the plurality of discharge ports, respectively, and a common liquid chamber which communicates with the plurality of individual liquid chambers; and an element board including:

a plurality of elements which generates energy for discharging the liquid disposed in the individual liquid chambers, a first supply port connecting to the common liquid chamber, a first collecting port connecting to the common liquid chamber, a second supply port disposed a further toward an outer side than an end portion of the discharge-port row in the aligning direction and connecting to the common liquid chamber, and a second collecting port disposed further toward the outer side than the end portion of the discharge-port row in the aligning direction and connecting to the common liquid chamber, wherein the first supply port, the common liquid chamber, and the individual liquid chamber are disposed in the order as listed along a flow of the liquid.

2. The liquid discharge head according to claim 1, wherein the second supply port and the second collecting port are disposed at positions deviated from a dischargeable area with respect to a medium by the discharge-port row in the aligning direction.

3. The liquid discharge head according to claim 1, wherein the first supply port and the second supply port are aligned in one row in parallel with the discharge-port row, and the first collecting port and the second collecting port are aligned in one row in parallel with the discharge-port row.

4. The liquid discharge head according to claim 3, wherein a plurality of the first supply ports is aligned in parallel with the discharge-port row on one side with respect to the discharge-port row in a direction orthogonal to the aligning direction, and a plurality of the first collecting ports is aligned in parallel with the discharge-port row on the other side with respect to the discharge-port row in the direction orthogonal to the aligning direction.

5. The liquid discharge head according to claim 4, wherein a plurality of the second supply ports is aligned in parallel with the discharge-port row on the one side with respect to the discharge-port row in the direction orthogonal to the aligning direction, and a plurality of the second collecting ports is aligned in parallel with the discharge-port row on the other side with respect to the discharge-port row in the direction orthogonal to the aligning direction.

6. The liquid discharge head according to claim 3, wherein an opening area of the second supply port is substantially same as an opening area of the first supply port, and an opening area of the second collecting port is substantially same as the opening area of the first collecting port.

7. The liquid discharge head according to claim 3, wherein an opening area of the second supply port is larger than an opening area of the first supply port, and an opening area of the second collecting port is larger than an opening area of the first collecting port.

8. The liquid discharge head according to claim 7, wherein the second supply port is longer than the first supply port in the aligning direction, and the second collecting port is longer than the first collecting port in the aligning direction.

9. The liquid discharge head according to claim 1, wherein in a case where assuming that the discharge port is a first discharge port and the element is a first element, the discharge-port forming member further includes a second discharge port, which is disposed further toward the outer side than the end portion of the discharge-port row in the aligning direction and discharges a liquid, and a second individual liquid chamber, which causes the second discharge port to communicate with the common liquid chamber and in which a second element is disposed.

10. The liquid discharge head according to claim 9, wherein the first element is used for discharge of a liquid to a medium; and the second element is not used for discharge of a liquid to a medium.

11. The liquid discharge head according to claim 10, wherein the first element and the second element are used for discharge of a liquid during maintenance.

12. The liquid discharge head according to claim 9, wherein the second supply port and the second collecting port are disposed in the vicinity of the second element.

13. The liquid discharge head according to claim 9, wherein the second supply port and the second collecting port are disposed at positions aligned with the second element in the aligning direction.

14. The liquid discharge head according to claim 1, wherein the first supply port and the second supply port are disposed in the common liquid chamber.

15. The liquid discharge head according to claim 1, wherein the discharge-port forming member further comprises an opening disposed en a further toward the outer side than the end portion of the discharge-port row in the aligning direction.

16. The liquid discharge head according to claim 1, wherein the second supply port, the common liquid chamber and the individual liquid chamber are disposed in the order as listed along the flow of the liquid.

17. The liquid discharge head according to claim 1, wherein the individual liquid chamber, the common liquid chamber and the first collecting port are disposed in the order as listed along the flow of the liquid.

18. The liquid discharge head according to claim 1, wherein the individual liquid chamber, the common liquid chamber and the second collecting port are disposed in the order as listed along the flow of the liquid.

19. The liquid discharge head according to claim 1, wherein the element board further includes a common supply channel for supplying the liquid to the common liquid chamber, and wherein the first supply port and the second supply port are positioned between the common liquid chamber and the common supply channel.

20. The liquid discharge head according to claim 1, wherein the element board further includes a common collecting channel for collecting the liquid from the common liquid chamber, and wherein the first collecting port and the second collecting port are positioned between the common liquid chamber and the common collecting channel.

* * * * *